United States Patent Office 3,437,180
Patented Apr. 8, 1969

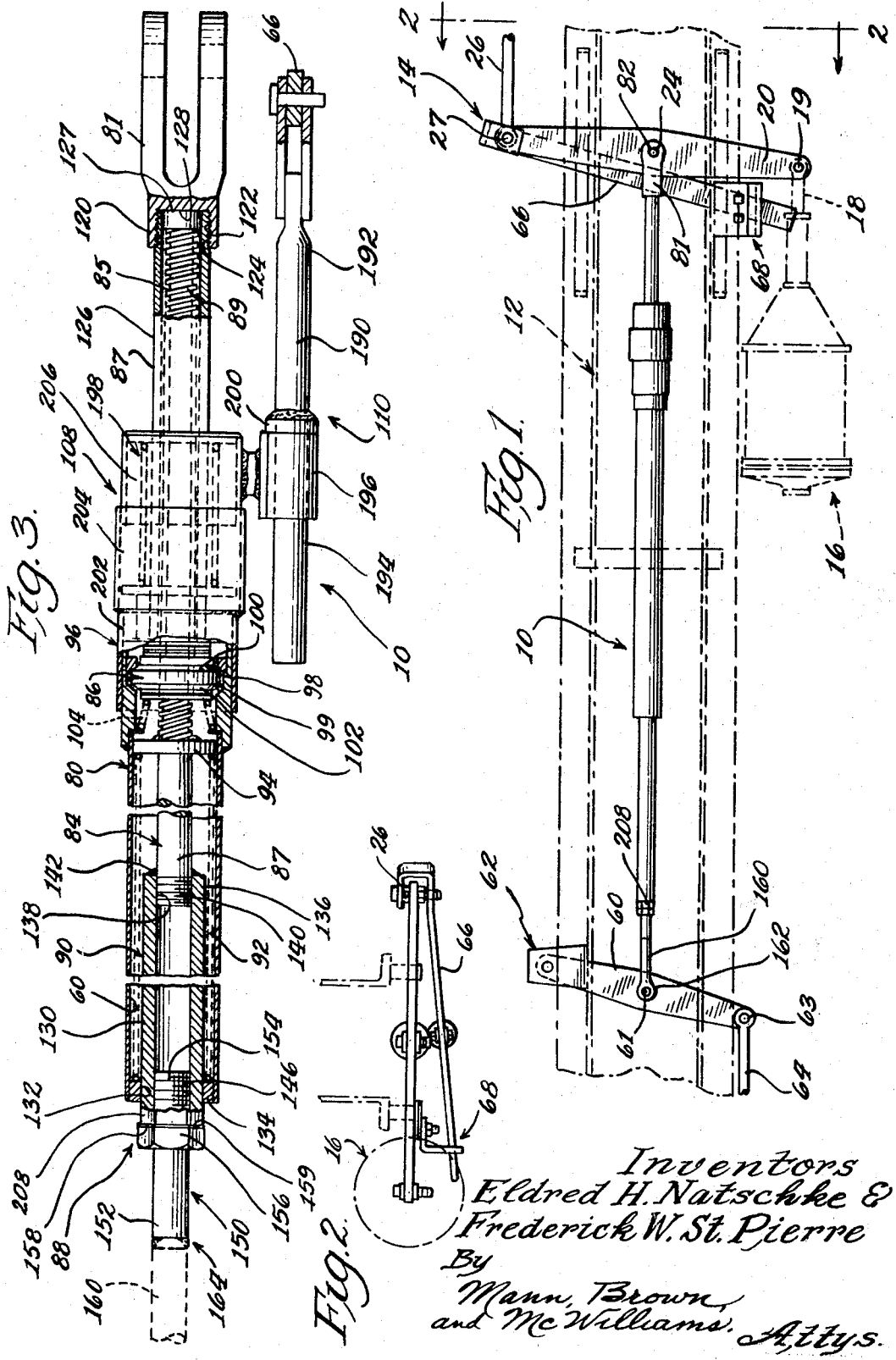

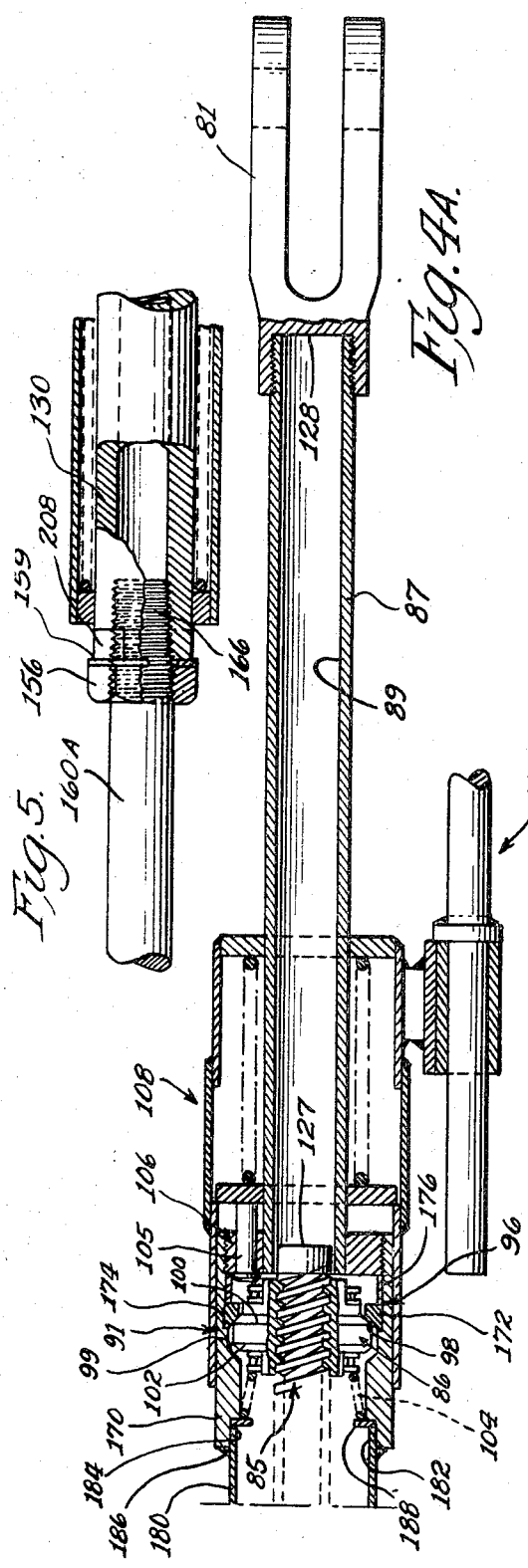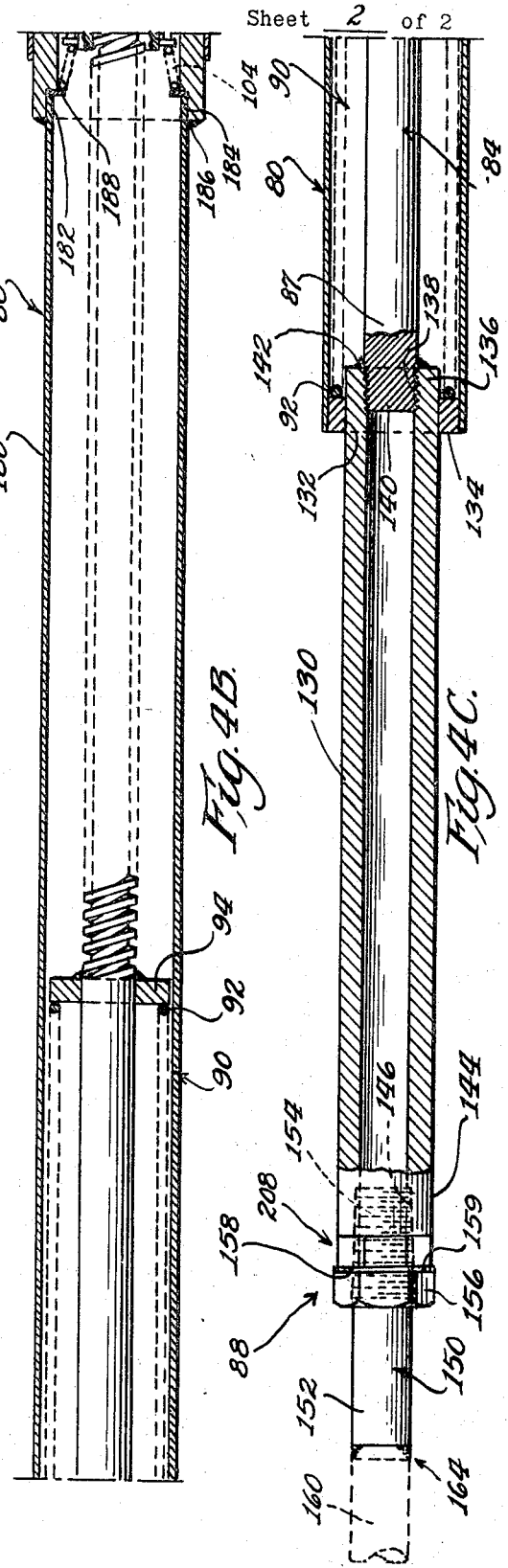

3,437,180
TWO-WAY AUTOMATIC BRAKE ADJUSTER
Eldred H. Natschke, Kankakee, and Frederick W. St. Pierre, Downers Grove, Ill., assignors to Universal Railway Devices Co., a corporation of Delaware
Filed June 27, 1967, Ser. No. 649,239
Int. Cl. F16d 65/56, 65/38
U.S. Cl. 188—202    5 Claims

ABSTRACT OF THE DISCLOSURE

The invention relates to a two-way automatic brake adjuster for use in railroad car brake rigging and is an improvement over that disclosed in Rauglas Patent 3,177,985. In accordance with the improvements of this application, the adjuster is arranged to provide 19 inches of travel within a maximum extended length limitation of 90 inches, and is provided with a fitting arrangement for connecting the adjuster screw rod into the brake rigging that adapts the adjuster for ready application to various car builder car designs. The fitting arrangement includes a throw-away rod element that may be left in place and welded to an adjacent connecting rod component for applying same to the rigging, or may be discarded so that a different type of connecting rod component may be applied to the connection that serves to attach the throw-away element to the adjuster.

---

The principal commercial form of the adjuster disclosed in Rauglas Patent 3,177,985 has been designed to provide 17 inches of travel between maximum slack let out and take up positions within a maximum extended length of 85 inches between the housing member clevis and the extreme end of the welding stud of the screw rod extension fitting. While some additional travel has been found to be desirable, the achieving of added travel by merely making the adjuster relevant parts longer results in the maximum extended distance of the adjuster being increased about three inches for each additional inch of travel built into the adjuster (assuming the special tubular screw rod arrangement of our Patent No. 3,404,759, granted Oct. 8, 1968 is not employed), in addition to which the customary 4 inch welding stud at the end of the screw rod extension fitting must be added. Thus, the addition of 2 inches travel to the 17 inch travel unit would make it 95 inches in extended length which would violate AAR regulations.

A principal object of this invention is to provide a 19 inch travel adjuster of the type indicated while keeping the maximum extended length to no more than about 90 inches and retaining the basic essentials of the adjuster of the above patent.

Another principal object of the invention is to provide an arrangement for connecting the adjuster screw rod into the rigging that accommodates the various connection arrangements used by car builders.

Other objects of the invention are to simplify the basic adjuster of the above patent while at the same time achieve maximum travel within the indicated 90 inches maximum length dimension, and to provide an adjuster which is economical of manufacture, convenient to install, and long lived in use.

Still other objects, uses, and advantages will be obvious or become apparent from a consideration of the following detailed description and the application drawings in which like reference numerals are employed to designate like parts throughout the several views.

In the drawings:

FIGURE 1 is a diagrammatic plan view illustrating a typical center rod type application to which the adjuster of this invention has been applied;

FIGURE 2 is a diagrammatic cross-sectional view taken substantially along line 2—2 of FIGURE 1;

FIGURE 3 is an elevational view of the adjuster, on an enlarged scale and with parts broken away to facilitate illustration, showing the adjuster in its contracted or full slack take up position;

FIGURES 4A, 4B, and 4C taken together are a composite view similar to that of FIGURE 3 but showing the adjuster in its maximum extended or slack let out position; and FIGURE 5 is a fragmental view illustrating an alternate way of securing the adjuster screw rod to the brake rigging dead lever.

However, it is to be understood that the specific drawing illustrations provided are supplied primarily to comply with the requirements of the Patent Code and that the invention is susceptible of other embodiments that are intended to be covered by the appended claims.

Referring first to FIGURES 1 and 2, reference numeral 10 generally indicates a diagrammatically illustrated embodiment of this invention incorporated in the center rod structure 12 of a conventional brake rigging arrangement generally indicated by reference numeral 14, which may be of the type more fully illustrated and described in said Rauglas patent (the entire disclosure of which is incorporated herein by this reference). Reference may be had to said Rauglas patent for a specific description of brake rigging 14 and it suffices for present purposes to point out that brake rigging 14 customarily includes an air actuated brake cylinder 16 that is secured to the car in any suitable manner and includes a thrust or piston rod 18 that is pivotally connected as at 19 to cylinder lever 20 which is in turn pivotally connected to the center rod structure 12 as at 24 and a connecting rod 26 as at 27 that extends to one of the car trucks.

The center rod structure 12 is also pivotally connected as at 61 to dead lever 60 which is fulcrumed in any suitable manner to the car structure as at 62 and which is pivotally connected as at 63 to connecting rod 64 that extends to the other car truck. Connecting rods 26 and 64 are connected to the truck brake apparatus of the respective trucks in any conventional manner, such as that shown in the Rauglas patent.

As is disclosed in said Rauglas patent, when braking of the car is to be effected, the brake cylinder 16 is actuated to move its thrust or piston rod 18 to the right of FIGURE 1, which tends to throw the cylinder lever 20 counterclockwise about the pivotal connection 24 with the center rod structure, and tends to move the connecting rod 26 to the left to operate the trunk brake apparatus that rod 26 is connected to. Similarly, dead lever 60 swings counterclockwise about its pivotal connection 62 to draw connecting rod 64 to the right of FIGURE 1 to operate the truck brake apparatus that it is connected to. The brakes are in effect released when air is released from the cylinder 16 (in a conventional manner) due to the fact that the weight of the truck brake beams tends to swing them away from the respective truck wheels about the respective brake beam pivotal hanger mountings, which causes the connecting rods 26 and 64, cylinder lever 20, dead lever 60 and the thrust or piston rod to move in the opposite directions and back to their running positions.

During this functioning of the adjuster 10, the adjuster operates under the control of operating or trigger lever 66 that is connected between the cylinder lever 20 at pivotal connection 27, and a bracket structure 68, in the manner disclosed in said Rauglas patent, to control the slack let out and take up functions of adjuster 10. As disclosed in said Rauglas patent, the general function served by adjuster 10 is to consistently maintain the stroke of the brake cylinder at a predetermined length (7 inches in accordance with AAR regulations) and to automatically accommodate or effect the brake rigging slack take up and let out that is involved in providing such results.

In the forms illustrated, the cylinder lever 20, dead lever 60, and trigger lever 66 are supported from the car center sill 69 through the diagrammatically illustrated support brackets.

The adjuster 10 generally comprises an elongated housing member 80 pivotally connected to the cylinder or live lever by a suitable pin 82 (which forms the pivotal connection 24) applied between the cylinder lever 20 and a clevis 81 that is secured to housing member 80.

The housing member 80 receives screw rod member 84 that has one end 85 thereof suitably screw threaded for cooperation with a spin nut 86 that functions in accordance with the teachings of said Rauglas patent to provide for slack take up and let out. Rod member 84 at its other end 83 is adapted in accordance with the teachings of this invention for connection to dead lever 60 through a special fitting structure 88.

The housing member 80 includes a tubular portion 87 defining a bore 89 which receives the screw threaded end 85 of rod member 84 as the adjuster operates to take up slack. Housing 80 also defines a spring chamber 90 in which is received about the rod member 84 a helical spring 92 that acts, between housing 80 and a spring seat 94 fixed to rod member 84, in a manner to draw the rod member 84 inside the housing member 80 in a slack take up direction.

The housing member 80 includes a friction stop clutch assembly generally indicated at 96 that includes annular friction clutch or stop seats 98 and 99 that are disposed on either side of the spin nut 86 for cooperation with corresponding clutch surfaces 100 and 102 of the spin nut in the manner described in said Rauglas patent.

Associated with the spin nut 86 on one side thereof is a slack pay out or let out spring 104 and on the other side thereof the nut is engaged by a plurality of thrust pin members 105 slidably mounted in the end wall structure 106 of housing 80 and engaged by resiliently flexible thrust device 108 that forms a part of the slack take up and let out control assembly 110 which is associated with adjuster 10 for purposes of controlling the slack take up and let out functions of the adjuster.

The thrust device 108 and the slack take up control assembly 110 may be arranged as described in said Rauglas patent for operation under control of operating lever 66.

In accordance with this invention, the tubular portion 87 of housing 80 is attached to clevis 81 by having the stud portion 120 of the clevis bored as at 122 and internally threaded to cooperate with threading 124 on the external surface 126 of tubular portion 87 so that the terminal end surface 127 of screw rod end 85 may advance into clevis stud portion 120 in moving to its position of maximum contraction or slack take up, in which position surface 127 abuts the clevis stop surface 128. This arrangement permits a travel extension of up to an inch and a quarter over the corresponding arrangement shown in the Rauglas patent.

Further in accordance with this inventoin, the fitting structure 88 is provided which comprises a tubular member 130 slidably mounted within the opening 132 of housing end wall 134 and having its ends 136 internally threaded as at 138 for threadedly receiving the threaded terminal portion 140 of screw rod 84 at its end 83, with the parts being held in fixed relation by welding as at 142.

The other end 144 of the tubular member 130 is internally threaded as at 146 to receive a throw-away type rod element 150 comprising a shank 152 formed with a threaded end portion 154 that cooperates with the internal threading 146 of tubular member 130 for the purpose of securing the element 150 to the member 130. Carried by the threaded portion 154 of element 150 is hex nut 156 that is preferably turned up against the terminal end portion 158 of tubular member 130 to lock the element 150 in place. Lock washer 159 is preferably interposed between nut 156 and end portion 158.

The tubular member 130 and its throw-away rod element 150 adapts adjuster 10 for application to existing car builders brake rigging arrangements of the center rod application type and especially for connection to the dead lever thereof. Thus, for those applications where the dead lever 60 is provided with a rod component 160 (which includes eye 162 that is to be keyed to dead lever 60 by pin 61), the rod element 150 is retained and is mounted substantially as shown in FIGURES 3 and 4C for connection to element 160 as by welding at 164. Thus, the shank portion of element 150 serves as the welding stud for that element, and by loosening nut 156 and turning element 150 with respect to tubular member 130, the exact fit desired with respect to element 160 may be obtained, after which the nut 156 is tightened to lock element 150 in place with respect to the member 130.

In the event that the car builder employs a rod element 160A (see FIGURE 5) that is of the type having sufficient length to extend between pin 61 and tubular member 130, the element 150 is discarded and the end portion 166 of element 160A is threaded for cooperation with the threading 146 of the member 130 so that it can be turned directly into the member 130, with the nut 156 and lock washer 159 being retained and applied to the threaded portion 166 of element 160A for turning against the end surface 158 of the member 130 to lock element 160A with respect to member 130.

It has been found that the indicated manner of applying the clevis 81 to housing member 80 and the use of connector device 88 permits a reduction in length of 5 inches from the maximum extended dimension of the adjuster while permitting an additional 2 inches of travel over the 17-inch travel embodiment of the Rauglas patent.

Referring to FIGURE 4A, the stop nut clutch assembly 96 has been modified to make sleeve member 170 a one element member formed by a suitable machine operation to define clutch seat 99. Clutch seat 98 is formed on a separate hardened ring 172 that is held in place against a shoulder 174 formed in sleeve 170 by end wall structure 106 being turned against retainer sleeve 176.

Spring chamber 90 is defined by a separate tubular member 180 having its end 182 disposed within a counter bore 184 of sleeve 170 and secured in place by welding as at 186. The end 182 of tubular member 180 seats against disc member 188 that forms a spring seat for pay out spring 104.

The thrust device 108 as shown is in the form of a trigger arm 190 having one end 192 thereof suitably connected with operating lever 66 and the other end 194 slidably received in sleeve 196 that is fixed to cover structure 198 of thrust device 108. Fixed as by welding to arm 190 is disc 200 that is positioned so that the adjuster will have the desired stroke with new brake shoes in place. Cover structure 198 is composed of three welded together segments 202, 204 and 206 and is the same as that described in our said Patent No. 3,404,759 (the entire disclosure of which is incorporated herein by this reference).

Tubular member 130 is formed with hex surfaces where indicated at 208 so that a wrench may be applied thereto to aid in turning rod member 84 through the spin nut in assembling the apparatus.

The foregoing description and the drawings are given merely to explain and illustrate our invention and the invention is not to be limited thereto, since those skilled in the art who have our disclosure before them will be able to make modifications and variations therein without departing from the scope of the invention.

We claim:

1. In a brake adjuster adapted to form a part of a railroad car brake rigging as a force transmitting device, and including a rod member provided with a screw portion at one end thereof, a housing member mounted in telescoping relation to the rod member screw portion at one end thereof and including means at the other end thereof for securing same into the rigging, resilient means for biasing said members for movement in a slack take up direction from an extended relation to a contracted relation in which said rod member is substantially withdrawn inside said housing member, a nut threadedly received on said screw portion of said rod member, and means for actuating said nut during operation of the brake rigging to rotate in slack take up and let out directions as required to maintain the stroke of the rigging brake cylinder of substantially uniform length, the improvement wherein:

said rod member includes a tubular section at the other end thereof having one end thereof secured to said other end of said rod member, said tubular section being proportioned transversely thereof to be drawn within said housing member as said members are moved from said extended relation to said contracted relation, with the other end of said tubular section being internally threaded, and a rod element having one end thereof threadedly received in said tubular section other end and the other end adapted for welding to an extension member for securing said rod member into the rigging.

2. In a brake adjuster adapted to form a part of a railroad car brake rigging as a force transmitting device, and including a rod member provided with a screw portion at one end thereof, a housing member mounted in telescoping relation to the rod member screw portion at one end thereof and including clevis means at the other end thereof for securing same into the rigging, resilient means for biasing said members for movement in a slack take up directon from an extended relation to a contracted relation in which said rod member is substantially withdrawn inside said housing member, a nut threadedly received on said screw portion of said rod member, and means for actuating said nut during operation of the brake rigging to rotate in slack take up and let out directions as required to maintain the stroke of the rigging brake cylinder of substantially uniform length, the improvement wherein:

said rod member includes a tubular section at the other end thereof extending in substantial axial alignment therewith, with one end of said tubular section being made fast to said other end of said rod member, said tubular section being proportioned transversely thereof to be drawn within said housing member as said members are moved from said extended relation to said contracted relation, with the other end of said tubular section being internally threaded in axial alignment therewith, and a throw-away rod element having one end thereof threaded and threadedly received in said tubular section internally threaded other end and carrying a nut on said one end thereof for locking same to said tubular section and having the other end thereof proportioned lengthwise thereof for making a welded connection to rod means for securing said rod member into the rigging, whereby said rod member may be secured into said rigging by retaining said rod element and welding same to said rod means, or by removing said rod element and discarding same and threadedly connecting the rod means to said other end of said tubular section.

3. The improvement set forth in claim 2 wherein:

said housing member includes a tubular portion that is secured at one end thereof to said clevis means and receives said one end of said rod member in said contracted relation of said members, said housing member tubular portion being externally threaded and threadedly received in a threaded bore formed in said clevis means whereby said clevis means forms the contracted position limiting stop for said members.

4. The improvement set forth in claim 3 wherein:

said housing member and said rod member including said rod member tubular section and said housing member tubular portion are proportioned to move 19 inches relative to each other between said extended and contracted positions.

5. In a brake adjuster adapted to form a part of a railroad car brake rigging as a force transmitting device, and including a rod member provided with a screw portion at one end thereof and means at the other end thereof for securing same into the rigging, a housing member mounted in telescoping relation to the rod member screw portion at one end thereof and including clevis means at the other end thereof for securing same into the rigging, resilient means for biasing said members in a slack take up direction from an extended relation to a contracted relation in which said rod member is substantially withdrawn inside said housing member, a nut threadedly received on said screw portion of said rod member and within a portion of said housing, said housing portion carrying a stop clutch assembly including spaced seats adapted to be engaged by opposing clutch surfaces of said nut, and means for actuating said nut during operation of the brake rigging to rotate in slack take up and let out directions as required to maintain the stroke of the rigging brake cylinder of substantially uniform length, the improvement wherein:

said rod member includes a tubular section at the other end thereof extending in substantial axial alignment therewith, with one end of said tubular section being made fast to said other end of said rod member, said tubular section being proportioned transversely thereof to be drawn within said housing member as said members are moved from said extended relation to said contracted relation, with the other end of said tubular section being internally threaded in axial alignment therewith, and a throw-away rod element having one end thereof threaded and threadedly received in said tubular section internally threaded other end and carrying a nut on said one end thereof for locking same to said tubular section and having the other end thereof proportioned lengthwise thereof for making a welded connection to rod means for securing said rod member into the rigging, whereby said rod member may be secured into said rigging by retaining said rod element and welding same to said rod means, or by removing said rod element and discarding same and threadedly connecting the rod means to said other end of said tubular section, said throw-away element and the nut carried thereby and said rod means comprising said means for securing said rod member other end into the rigging, and wherein said stop clutch assembly includes a one-piece housing element formed to define one of said seats, and whereby the other seat is defined by a separate annular element releasably mounted inside said housing element.

References Cited

UNITED STATES PATENTS 3,177,985   4/1965   Rauglas.
3,326,335   6/1967   Billeter.

DUANE A. REGER, *Primary Examiner.*

U.S. Cl. X.R.

188—196